Aug. 20, 1940.    R. N. VAN BUSKIRK    2,212,282
GEAR SHIFTING MECHANISM
Filed May 20, 1937    10 Sheets-Sheet 4
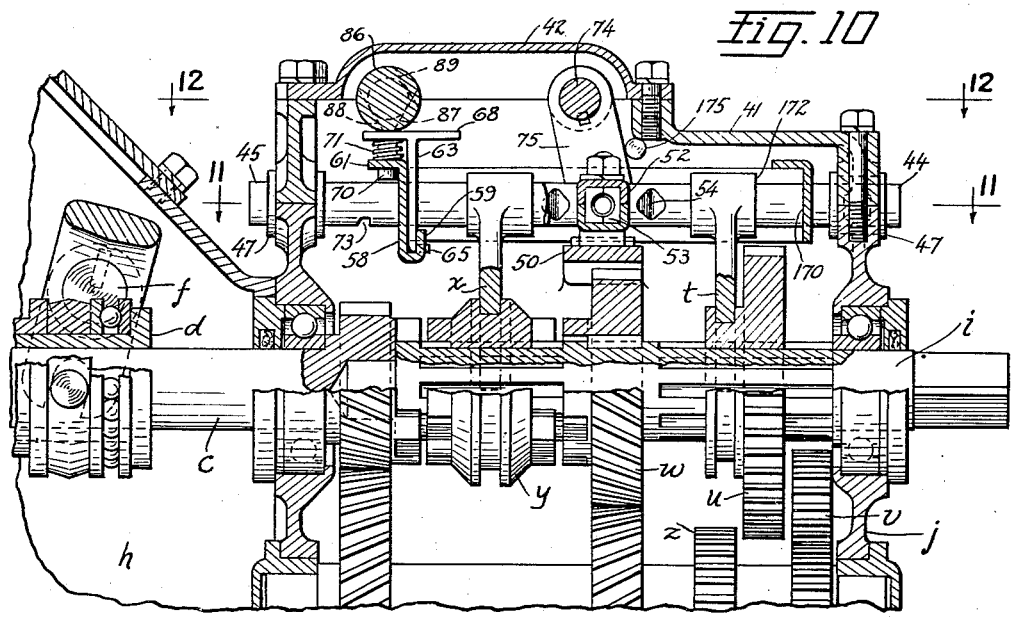
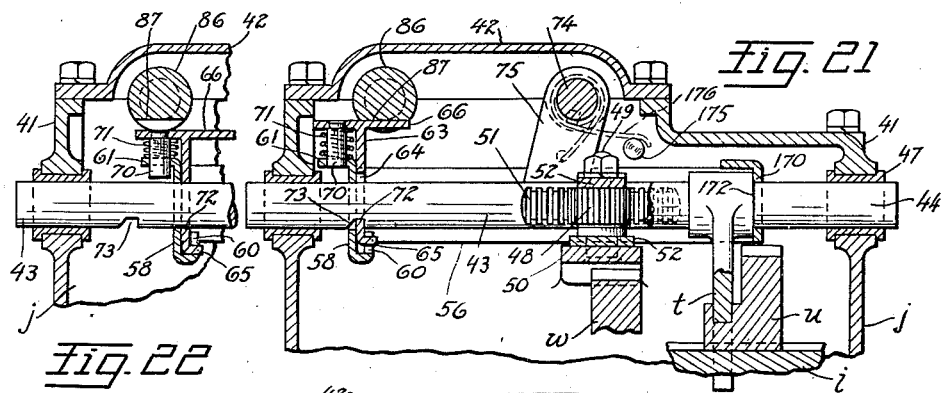
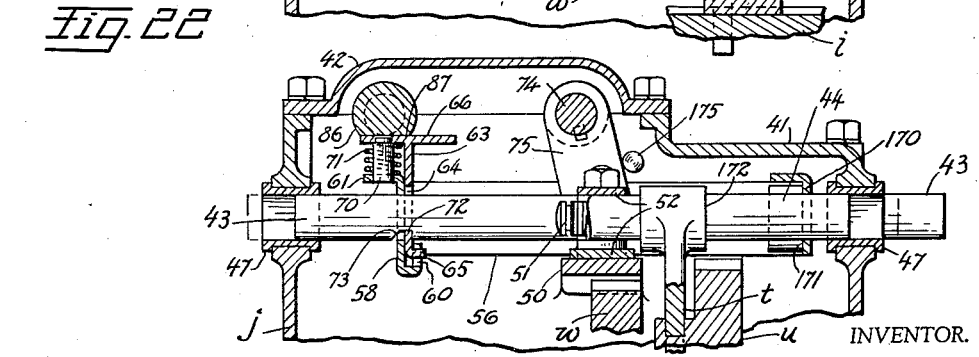
INVENTOR.
ROBERT N. VAN BUSKIRK
BY
ATTORNEY.

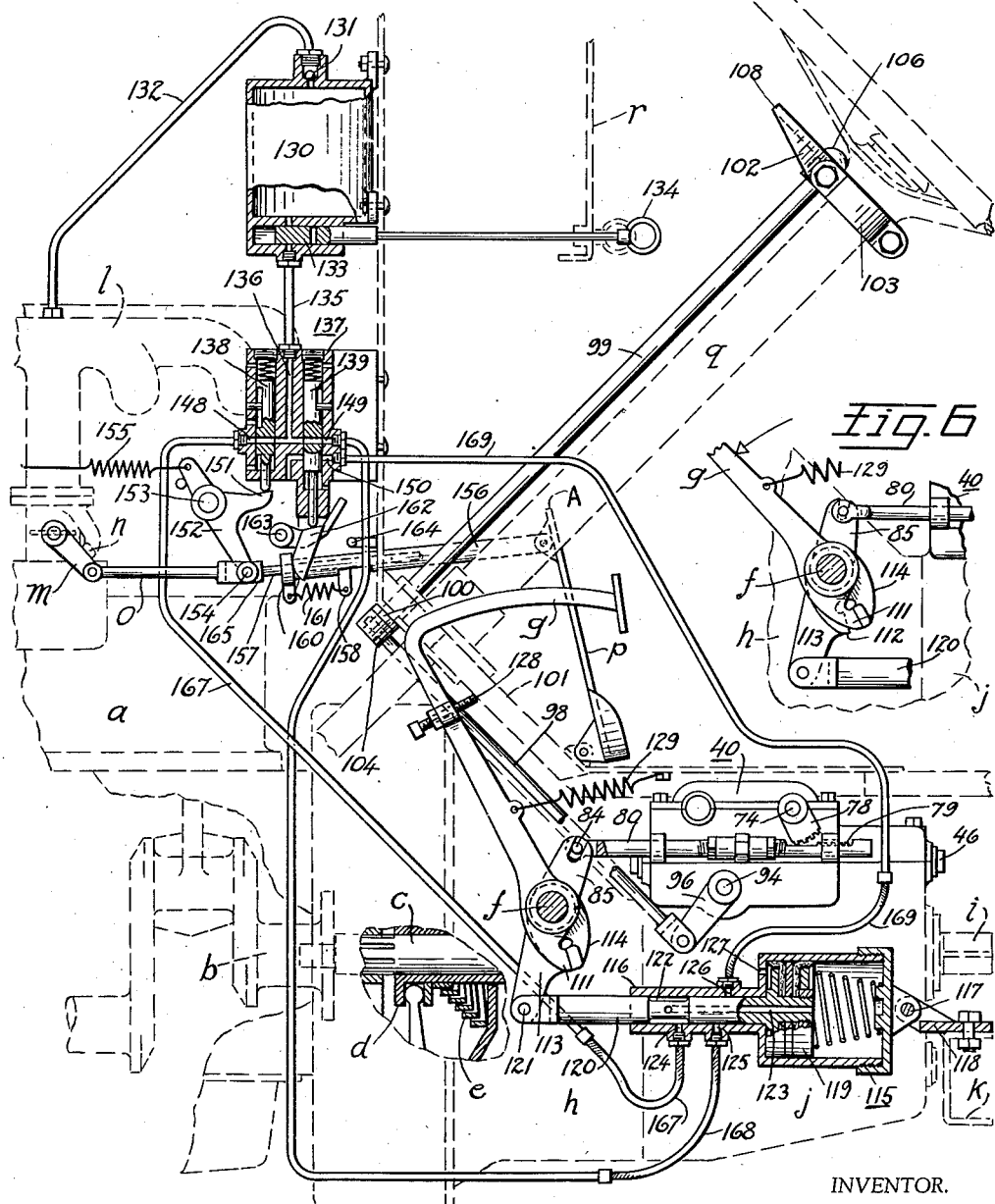

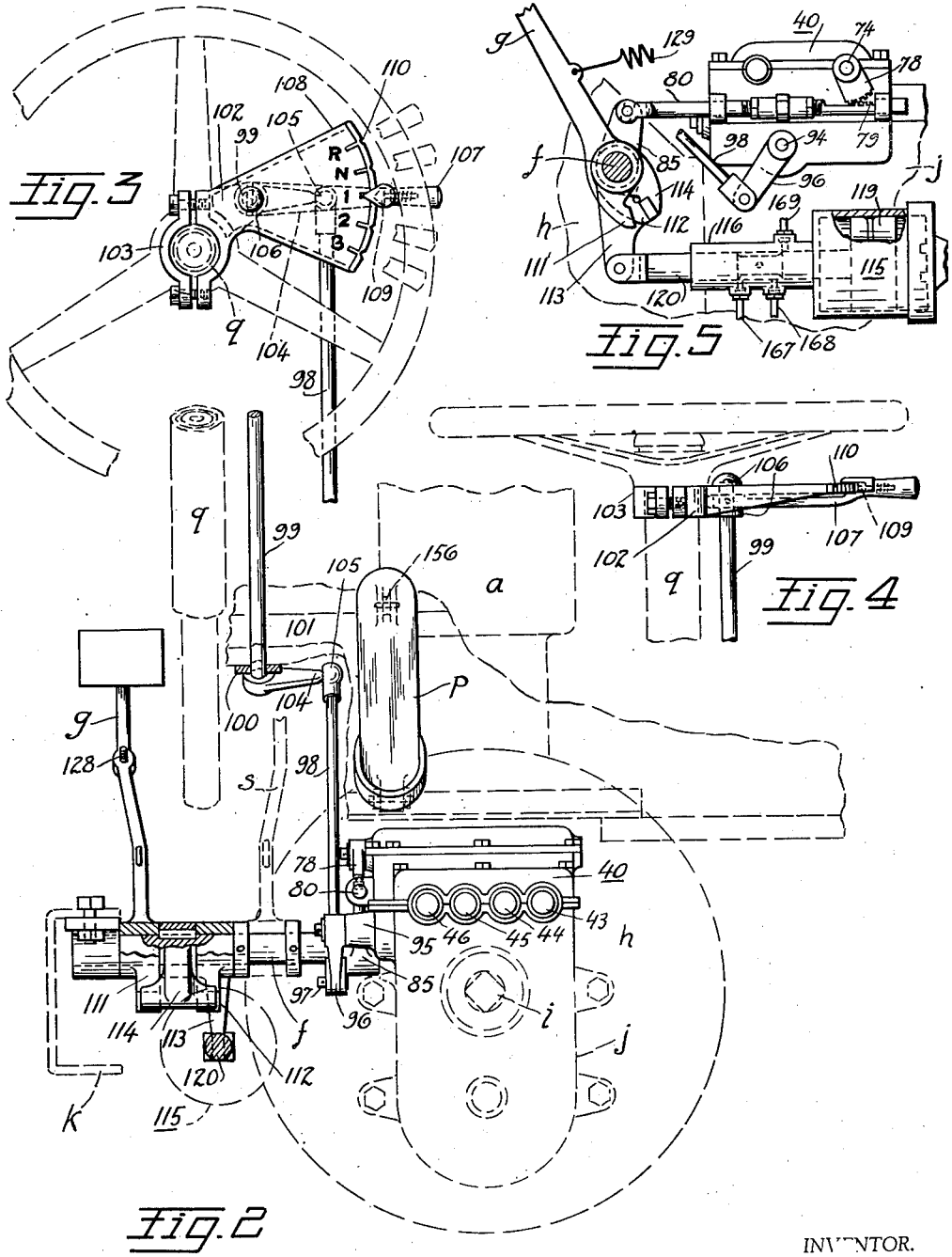

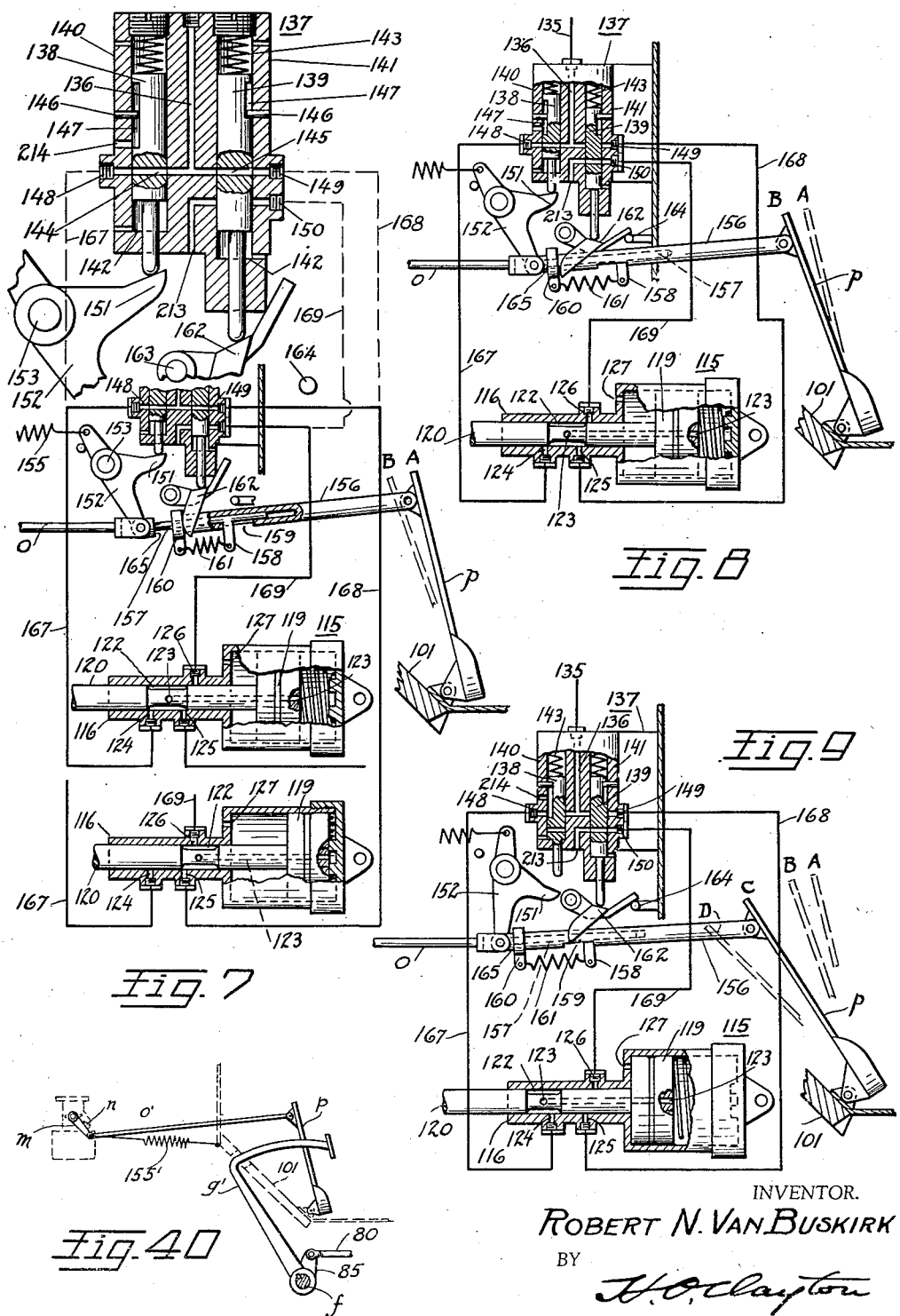

INVENTOR.
ROBERT N. VAN BUSKIRK
ATTORNEY.

INVENTOR.
ROBERT N. VAN BUSKIRK
BY
ATTORNEY

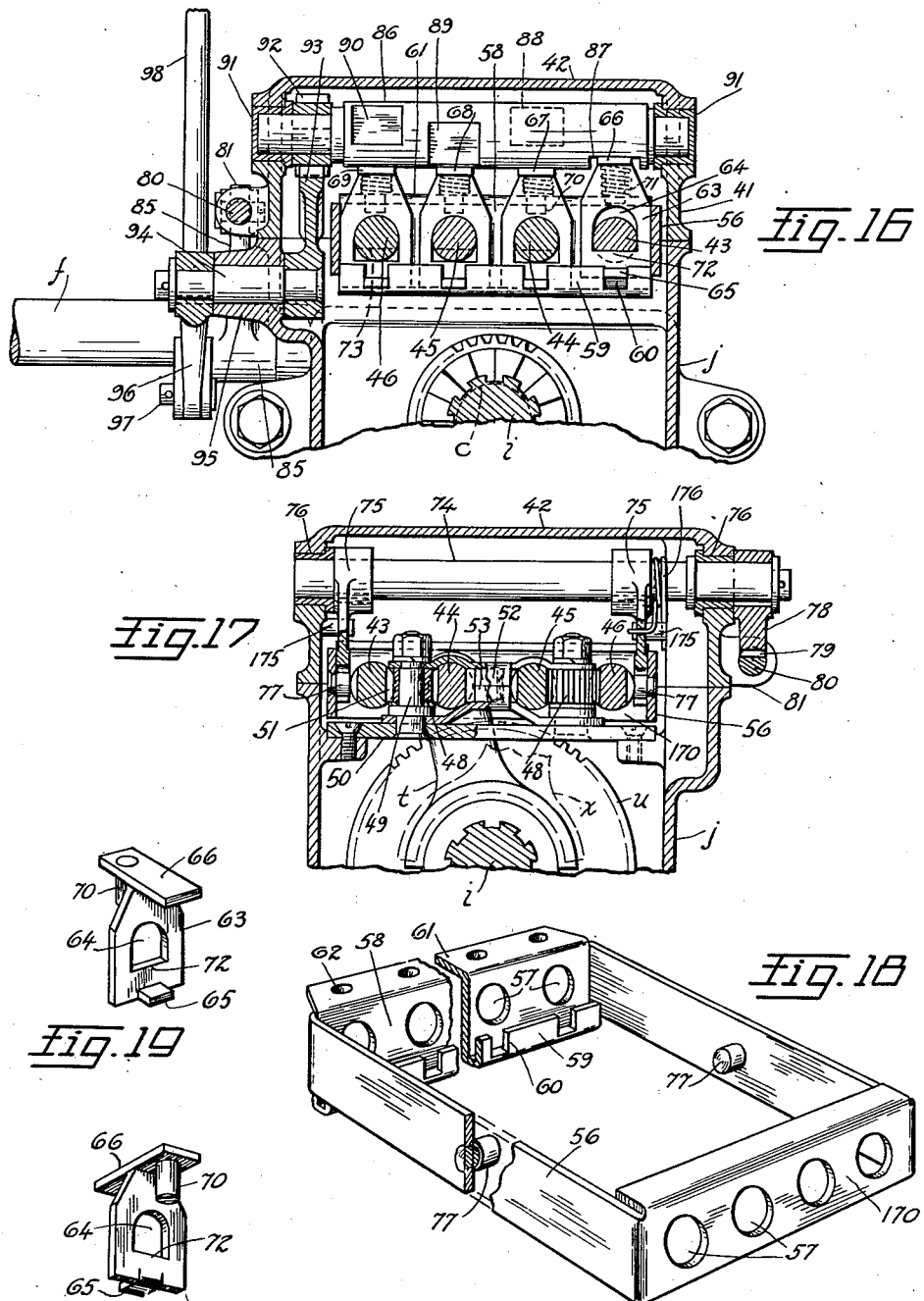

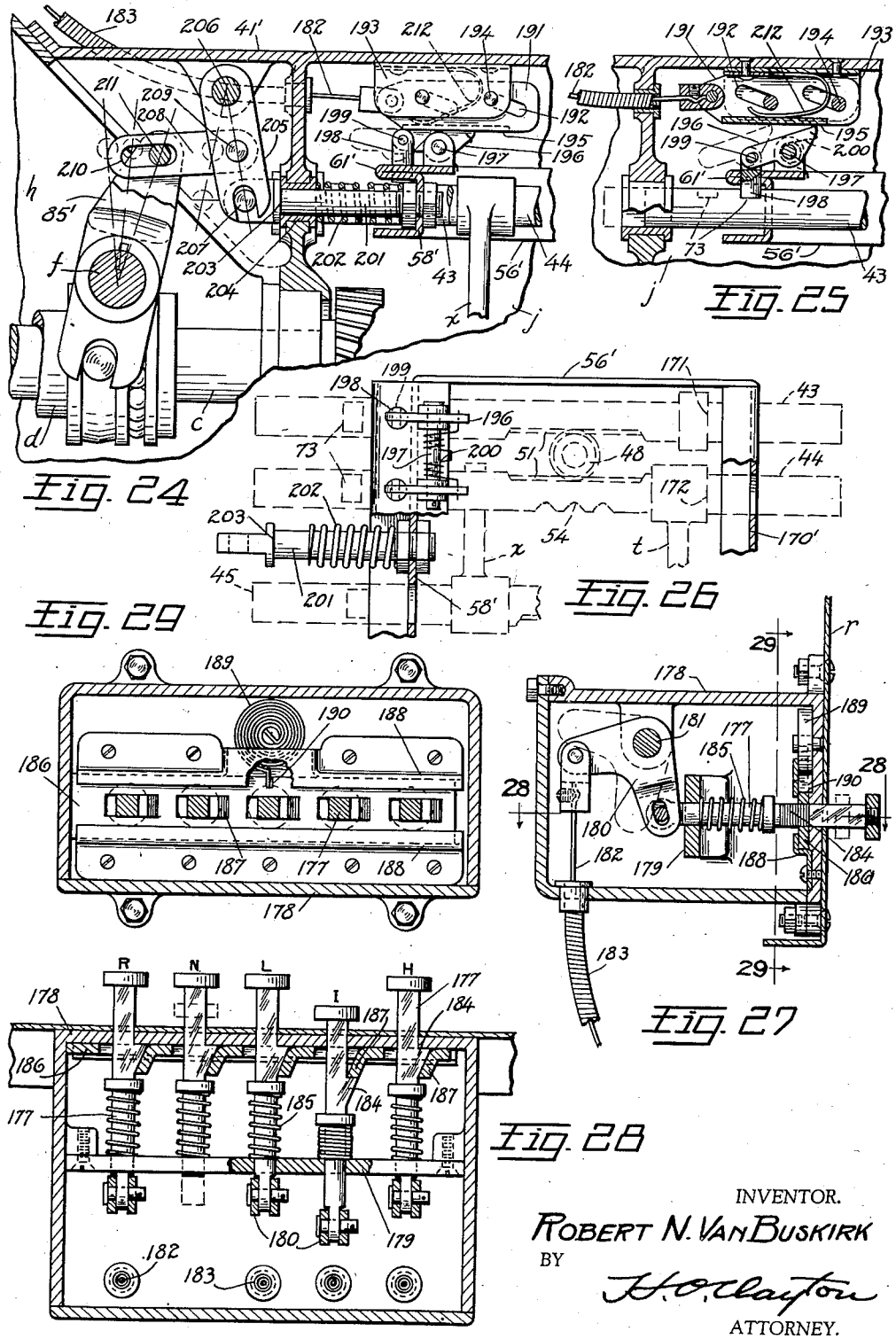

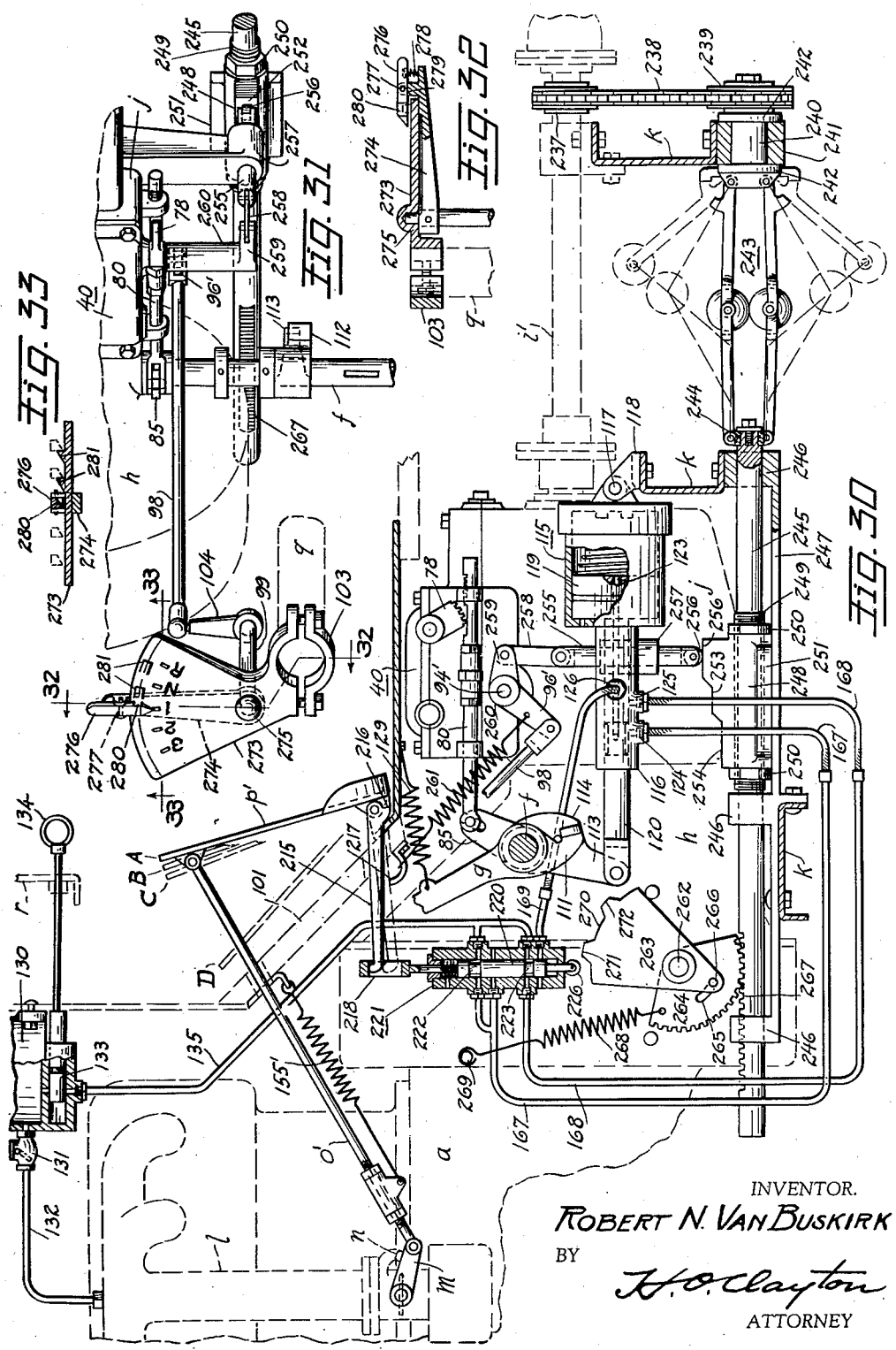

Aug. 20, 1940. R. N. VAN BUSKIRK 2,212,282
GEAR SHIFTING MECHANISM
Filed May 20, 1937     10 Sheets-Sheet 10
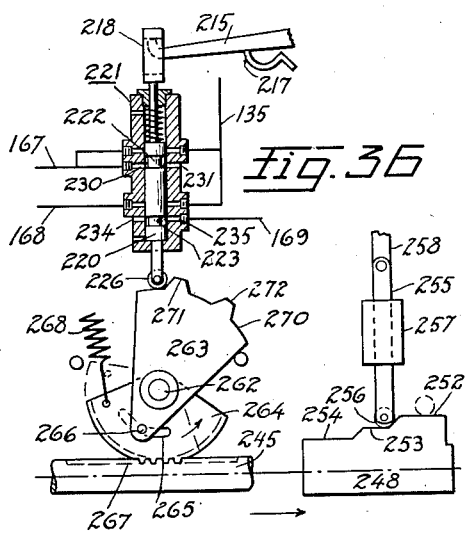
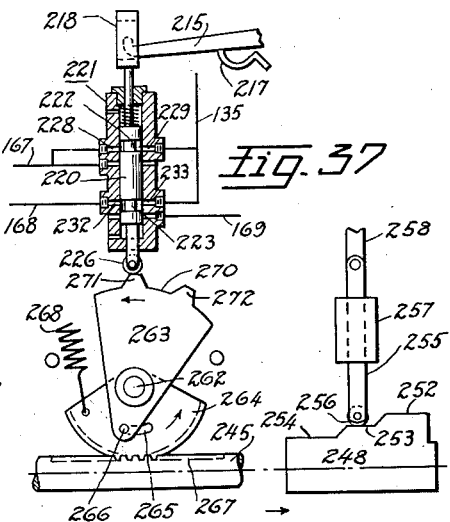
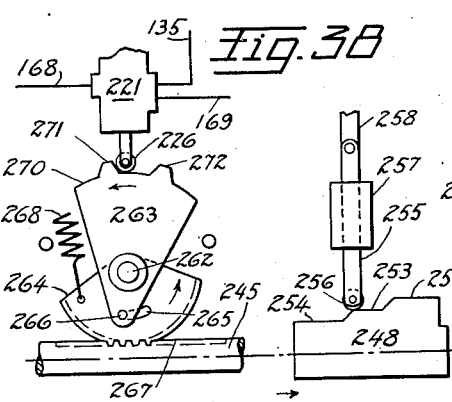
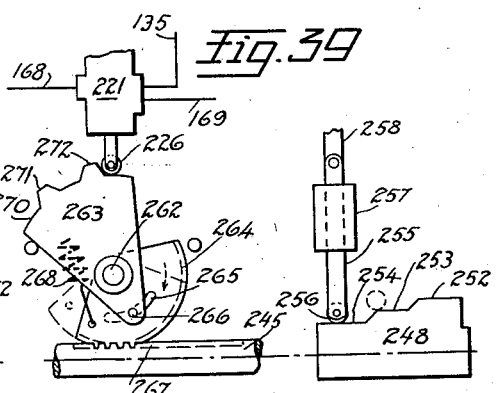
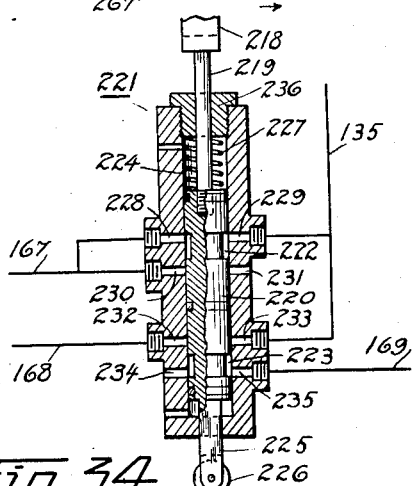
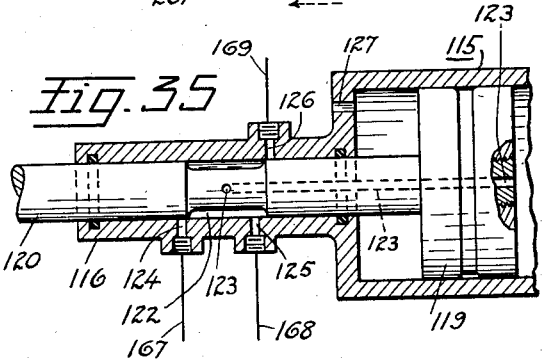
INVENTOR.
ROBERT N. VAN BUSKIRK
BY
*H. O. Clayton*
ATTORNEY Patented Aug. 20, 1940

2,212,282

UNITED STATES PATENT OFFICE 2,212,282

GEAR SHIFTING MECHANISM

Robert N. Van Buskirk, Detroit, Mich., assignor to Bendix Products Corporation, South Bend, Ind., a corporation of Indiana Application May 20, 1937, Serial No. 143,705

5 Claims. (Cl. 74—334)

This invention relates to improvements in speed change mechanisms for motor vehicles and more particularly to improvements in the construction and operation of the conventional speed change transmission rendering the same operable by either a selective finger controller or automatically in response to the speed of the vehicle.

An important object is to improve the operation of the speed change mechanism between the power unit of the motor vehicle and the driving road wheels. As a result of this invention, the use of a conventional gear shift lever is eliminated and in its place a semi-automatic or full automatic controller may be substituted. Another object of this invention is to provide an improved gear shifting mechanism for the speed change transmission which is strong, rugged and easily operated and which may be installed or incorporated in the conventional transmission without radically altering the construction thereof.

Another important object of this invention is to combine the improved gear shift mechanism with the clutch operating parts in such a novel way that the shifting operation is effected when the clutch parts are operated thus doing away with the need of a separate power unit for accomplishing the gear shifting operation. Another object of this invention is to provide novel manual, vacuum power, or automatic vehicle speed controllers for regulating the gear shifting action in the transmission. Dual optional control of the shifting mechanism may be effected between the various forms of controllers, such as between the manual control through the clutch pedal and the vacuum control by means of a vacuum power unit or between the power and fully automatic vehicle speed controller. When power means is employed to shift the gears, novel connecting means may be employed which operate the gear shifting through clutch operating parts but not including the clutch pedal so that the latter is not moved when the shifting operations are performed. Dual manual and power control over the shifting operation insures positive manual operation in the event of failure of the power operating means.

A meritorious feature of the invention is found in the pre-selecting mechanism which is capable of selecting the desired speed change at any time, irrespective of whether the transmission elements are already engaged or whether the vehicle is moving or standing still. This simplifies driving in city traffic since it is possible to select any gear change without progressively going through the gear changes leading to the desired selection.

When manual control is exercised over the gear shifting, such as through the clutch pedal, there is no need of synchronized manual action between the gear change selection and the acceleration of the motor or between the gear change selection and the clutching operation.

A still further object of the invention is to provide an improved speed change mechanism which is completely automatically responsive to all forward speeds of the motor vehicle. Provision is made for either manual or fully automatic control. When automatically controlled, novel means is provided for indicating to the driver all the forward speeds automatically selected by the speed of the motor vehicle.

Various other objects, advantages and meritorious features of my invention will appear more fully in the following description, accompanying drawings and appended claims, wherein:

Fig. 1 shows a side elevation of a portion of a conventional automobile indicated in dotted lines, with my invention and component parts applied thereto in a schematic manner.

Fig. 2 is a similar illustration of a portion of and viewed from the right of Fig. 1, Figs. 3 and 4 show a plan and elevation respectively of the selecting means.

Figs. 5 and 6 are fragmentary views of a portion of Fig. 1 illustrating optional methods of operating the clutch and shifting mechanism.

Fig. 7 is a diagrammatic view showing the vacuum control elements positioned for one stage of control, with an enlarged detail of the vacuum control valve.

Figs. 8 and 9 are views similar to the above, showing two other stages of the clutch throw-out shaft control.

Fig. 10 is a longitudinal section of the shifting mechanism applied to a conventional transmission, taken on line 10—10 of Fig. 11.

Figure 11:
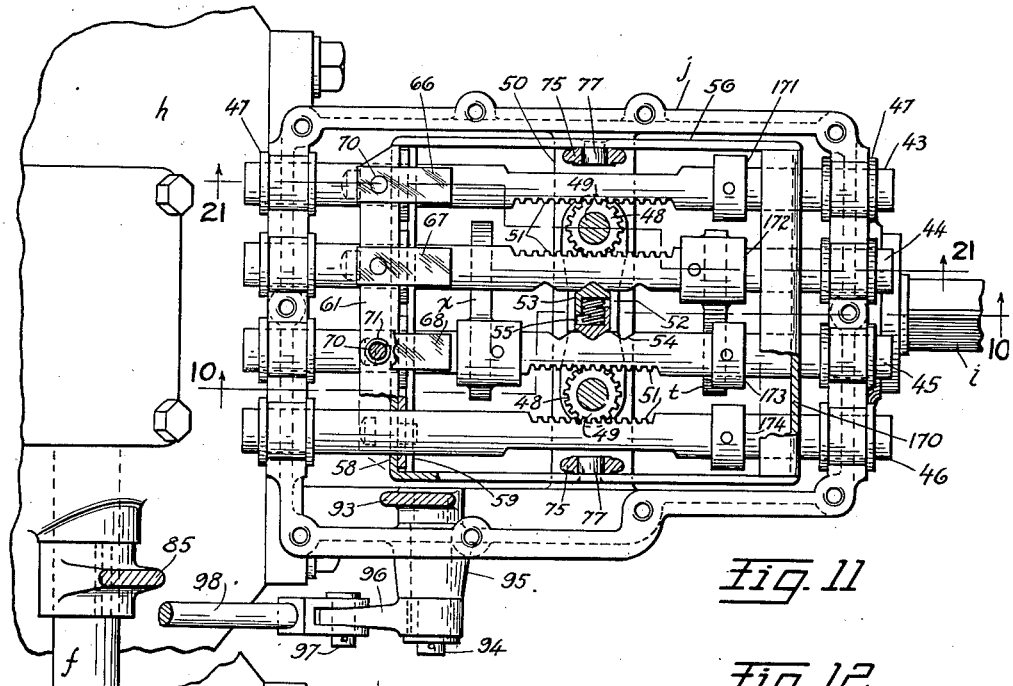
Figure 12:
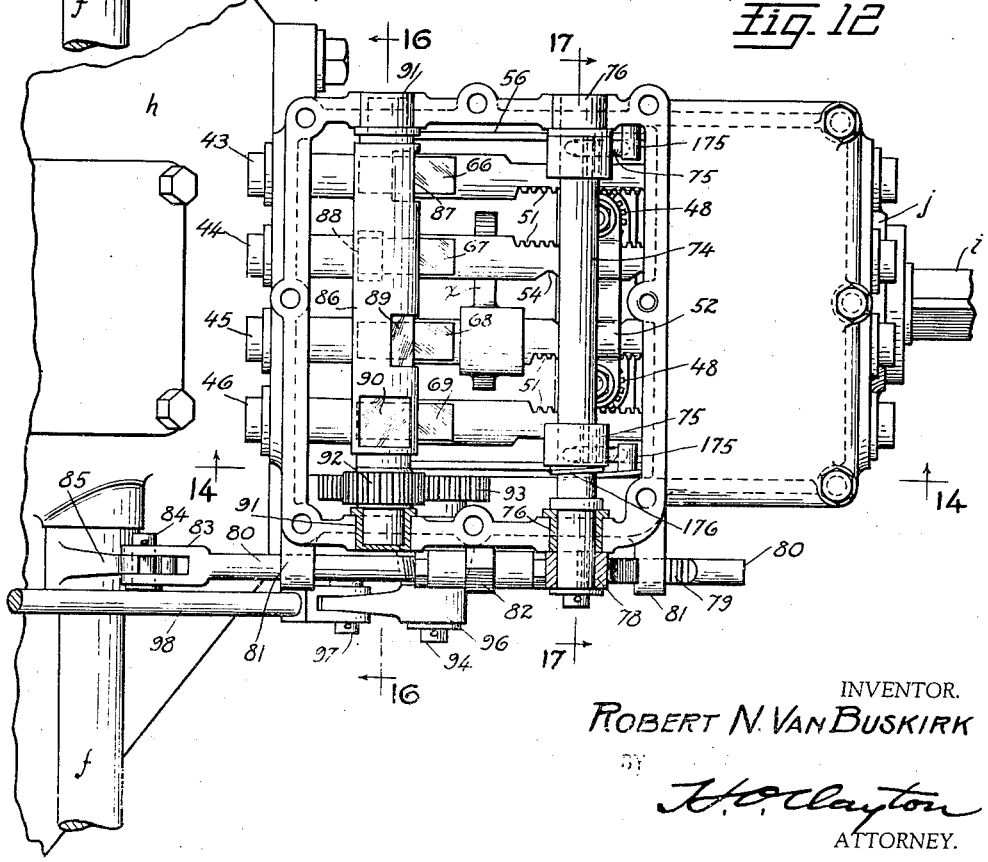

Figs. 11 and 12 are plan sections as indicated by lines 11—11 and 12—12 respectively in Fig. 10.

Figure 13:
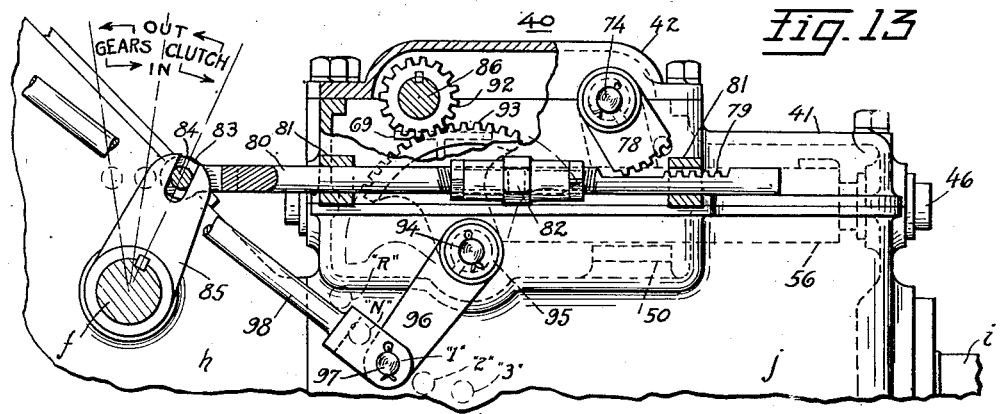

Fig. 13 is a side elevation of Fig. 12, partly broken away.

Figure 14:
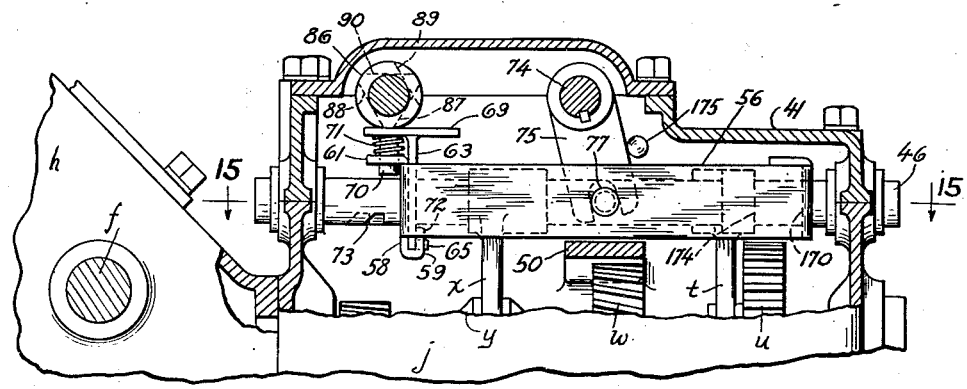

Fig. 14 is a sectional view taken on line 14—14 of Fig. 12.

Figure 15:
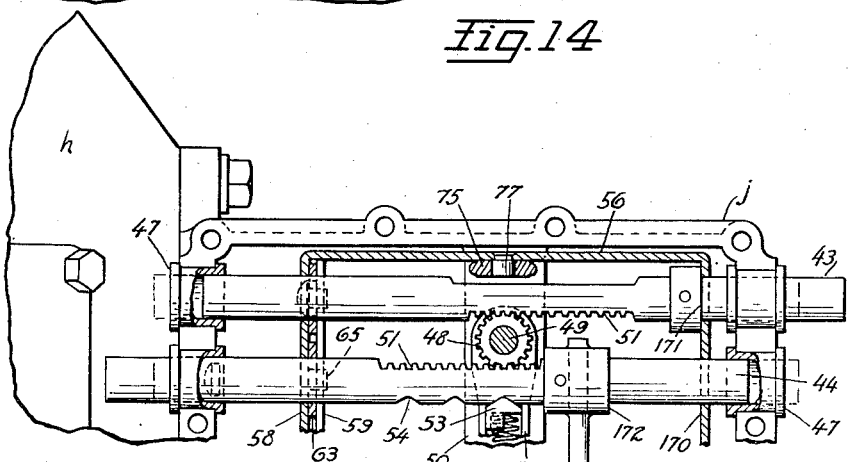

Fig. 15 is a sectional plan taken on line 15—15 of Fig. 14, showing the shift rods in position for "low" speed.

Figs. 16 and 17 are sectional elevations indicated by lines 16—16 and 17—17 respectively, in Fig. 12.

Fig. 18 is a perspective of the shift rod operating frame.

Figs. 19 and 20 are perspectives of one of the selecting members.

Figs. 21, 22 and 23 are fragmentary sections taken on line 21—21 of Fig. 11, illustrating sequential positions of the selecting and shifting members.

Figs. 24 and 25 are fragmentary sections corresponding to Figs. 10, 13 and 23, illustrating a modified means of selecting.

Fig. 26 is a fragmentary plan of the shift rod frame shown in Fig. 24, partly broken away.

Figs. 27, 28 and 29 are sectional views illustrating the manual selecting means for the modification shown in Fig. 24.

Fig. 30 is a schematic illustration corresponding to Fig. 1, showing an automatic control modification for the shifting mechanism.

Fig. 31 is a plan view of a portion of Fig. 30.

Figs. 32 and 33 are sectional views as indicated by lines 32—32 and 33—33 respectively in Fig. 31.

Fig. 34 is a detail section of the modified control valve.

Fig. 35 is a detail section of the vacuum cylinder valve used in both of the vacuum control systems.

Figs. 36, 37, 38 and 39 are diagrammatic views showing the various relational positions of the control valve and operating elements of the modification shown in Figs. 30 and 31.

Fig. 40 shows a modified clutch pedal and throttle rod.

In the drawings, Figs. 1 to 6 inclusive, conventional automobile motivating elements are shown mostly in dotted lines, and designated as a motor $a$, crank shaft $b$, clutch shaft $c$, clutch throw-out sleeve $d$, clutch spring $e$, clutch throw-out shaft $f$, clutch pedal $g$, clutch case $h$, transmission final drive shaft $i$, transmission case $j$, chassis frame $k$, fuel intake manifold $l$, throttle lever $m$, back stop $n$, throttle rod $o$, accelerator pedal $p$, steering column $q$, instrument panel $r$, and brake pedal $s$.

The conventional transmission structure shown in Fig. 10 operates in the usual manner, wherein the rearward movement of the shift fork $t$ causes the sliding gear $u$, splined on the shaft $i$, to engage with the idler pinion $v$ for "reverse" drive. Forward movement of the fork $t$ causes the gear $u$ to engage the auxiliary shaft gear $z$ for "low" speed ahead. The shift fork $x$ moved rearwardly causes the gear clutch member $y$, also splined on the shaft $i$, to engage with the constant-mesh gear $w$ for "intermediate" speed. Likewise when the fork $x$ is moved forwardly the clutch member $y$ engages the constant-mesh gear integral with the clutch shaft $c$, thereby effecting a direct drive for "high" speed.

For the purpose of clarity the principle of the gear shifting mechanism will be described first since substantially the same principle is utilized in all the modifications of the invention described herein.

The shifting mechanism indicated generally as 40 in Figs. 1 and 2, and as shown in detail in Figs. 10 to 23 inclusive, comprises a sub-case 41 and a cover 42 bolted to the transmission case $j$, within which the shift rods 43, 44, 45 and 46 reciprocate axially in the bearings 47 clamped between the walls of the cases $j$ and 41. The shift forks $t$ and $x$ are fixedly attached to the middle shift rods 44 and 45 respectively. Gears 48 journaled on studs 49 attached to the plate 50 secured to the case $j$, mesh with rack teeth 51 on the shift rods, one gear between the shift rods 43 and 44, and another gear between the rods 45 and 46. The gears 48 couple their respective pair of shift rods together so that when one rod is moved the other rod of the pair is moved an equal distance in the opposite direction. The rod pair 43 and 44 cooperate in shifting the fork $t$ for "reverse" and "low" speeds, and the rods 45 and 46 cooperate in shifting the fork $x$ for "intermediate" and "high" speeds.

Also mounted on the plate 50, between the rods 44 and 45, is a split bracket 52, within which is positioned a two-piece spring expanded dog 53, which in addition to serving as a detent in notches 54 when one rod is shifted, also interlocks with and withholds the opposite rod from movement, by virtue of the limited clearance 55 between the expanding halves of the dog.

For shifting the rods to alter the gear relationship in the transmission, a rectangular frame member 56, shown complete in Fig. 18, encloses the middle sections of the shift rods and is adapted to be reciprocated axially on the rods, the opposite ends of which extend through perforations 57 in both end walls of the frame. The front end wall 58 has a turned up retaining flange 59 having guideways 60 in alignment with the perforations 57. The front wall 58 also has a horizontal flange portion 61 extending forwardly, having perforations 62 also in alignment with the perforations 57. Attached substantially in the middle of the side walls of the frame 56 are trunnion pins 77. The rear wall 170 of the frame is adapted to abut against shoulders 171 to 174 carried by the shift rods as will be more fully described hereinafter.

A selecting shift rod locking device or dog 63 is illustrated in Figs. 19 and 20, one of such dogs being used for each shift rod. The purpose of these dogs is to releasably lock any one of the shift rods 43, 44, 45 and 46, with the rectangular frame for joint movement therewith. Each dog has a perforation 64 through which a shift rod extends. The four dogs each have an integrally formed horizontal tappet portion like that shown at 66 in Figs. 19 and 20. These tappets are arranged to cooperate with the shift rods 43, 44, 45 and 46 and are numbered 66, 67, 68 and 69 respectively. The dogs are retained in a row in juxtaposition with the inner side of the frame wall 58 by the frame flange 59 and the depending tappet studs 70 which are adapted to reciprocate vertically in the frame flange apertures 62. The dogs are permitted vertical movement but are restrained from rotative movement by means of the dog lips 65 which are adapted to reciprocate vertically in the ways 60 in the flanges 59.

Springs 71 are disposed about the studs 70 of each shift rod dog and interposed between the flange 61 and the tappet portions of the dogs. The springs urge the dogs upwardly and hold the bottom straight edges 72 of the dog perforation 64 up against the underside of the shift rods. The bottom edges 72 may extend into the notches 73 provided on each shift rod when the latter has been moved to a predetermined position relative to the rectangular frame as shown in Figs. 21 and 22.

The rectangular frame 56 is mounted for movement parallel to the movement of the shift rods. Means for moving the frame comprises a transversely extending shaft 74 surmounting the frame and rotatably supported in bearings 76 clamped between the case 41 and cover 42. Trunnion arms 75 keyed to the shaft 74 are spaced to straddle the shift rods and extend downward to engage the shift frame trunnion pins 77. This construction is probably best shown in Fig. 17.

To rock the shaft 74 and thus swing the frame 56, a gear sector 78 (see Fig. 13) is keyed to the outside end of the shaft 74 which extends outside of the case. This gear sector engages the toothed rack portion 79 of the shift frame operating rod 80 which is slidable axially within the bearings 81 of the case, in parallel relation to the inside shift rods. The rod 80 is provided with a right and left hand threaded turnbuckle 82, for pick-up adjustment of the rack teeth 79. The rod also has a clevis eye 83 at the forward end through which a pin 84 extends, engaging a slot in the operating lever 85 which is keyed to the clutch throw-out shaft *f*

Selector control mechanism for determining the gear change in the transmission comprises a rotatable selecting cam member 86 of a cylindrical form located above and at right angles to the shifting rods and substantially over the aforesaid dog tappets. The member 86, as shown in Figs. 12 and 16, is assembled within the bearings 91 which are clamped between the case and cover. The cam member has milled off flat cam faces 87, 88, 89 and 90 spaced along its axis in alignment with the shift frame tappets 66, 67, 68 and 69 respectively. These cam faces are also spaced in predetermined angular relation about the periphery of the member 86.

For rotating the cam member 86 and thereby successively bringing the flat cam faces 87, 88, 89 and 90 into contact with their respective dog tappets a pinion 92 is fixed on one end of the cam member within the case and gear sector 93 is meshed therewith. The gear sector 93 is attached to the spindle 94 which extends through the side wall of the case *j*, and is journaled in the case bearing 95. A sector operating lever 96 is keyed to the spindle 94 outside of said case, this lever being secured by the pin 97 to the connecting rod 98 which extends forwardly and upwardly in a plane substantially at right angles to the steering column *q*.

Referring to Figs. 1 to 6 inclusive, the rotating selector member 86 in the transmission housing may be remotely controlled by a manual control mechanism comprising a shaft 99 located in parallel relation and adjacent to the steering column and the connecting rod 98 extending at right angles thereto and connected to the selector member through lever 96 as previously described. Shaft 99 is disposed between a bearing bracket 100 which is attached underneath floor boards 101, and a selector bracket 102 which is secured to the upper portion of the steering column adjacent the steering wheel by a clamp 103. The lower end of the shaft 99 has fixedly attached thereto a lever 104 which is connected to the forward end of a connecting rod 98 by a ball joint 105. The upper end of shaft 99 is journaled in a bearing 106 in bracket 102, and is pinned to a manual selecting arm 107 positioned underneath a selector bracket 108. Arm 107 has a portion extending outwardly beyond said bracket substantially under and adjacent to the right hand portion of the steering wheel for accessible manual control of the same. The arm 107 is provided with a spring pressed detent 109 for engaging in notches 110 on the edge of bracket 108 and retaining the arm in any of the predetermined positions which may be selected. Characters "R," "N," "1," "2," and "3," representing "reverse," "neutral," "low," "intermediate" and "high" speeds respectively, are located on bracket 108 opposite notches 110. These characters correspond to the various respective cam faces and tappets within the selecting mechanism case.

When entirely manual control is desired, the clutch pedal *g* is arranged to swing the frame member 56 in the transmission housing. As shown in Figs. 1, 2, 5 and 6, the clutch pedal *g* is freely journaled on the clutch throw-out shaft *f* and carries an integral depending pick-up arm 111. A second depending pick-up arm 112, having an extended integral lever 113, is also freely journaled on shaft *f*. A third arm 114 is positioned between the pick-up arms 111 and 112 and is keyed to clutch shaft *f* in the same manner as the shifting mechanism lever 85, whereby both members, 114 and 85 operate in unison with the clutch throw-out shaft *f* and sleeve *d*. Arm 114 has a broadened extremity with which the pick-up arms 111 and 112 are adapted to register and abut. When the clutch pedal is depressed, pick-up arm 111 engages the broadened portion of arm 114 and swings the latter and shaft therewith.

The apparatus previously described is an entirely manually controllable gear shifting mechanism wherein movement of the clutch pedal is adapted to shift the gears in the transmission and wherein a finger controlled speed selector on the steering wheel column is adapted to control type of gear shifting which movement of the clutch pedal will impart. As has been previously mentioned, the shifting mechanism thus far described may be associated with a vacuum power device or a fully automatic device controlling the gear change by the speed of the vehicle. These modifications will be described hereinafter. At present the operation of the entirely manual control gear shifting mechanism will be described.

Movement of the clutch pedal *g* back and forth will impart reciprocal movement to the rectangular frame 56 in the transmission housing. Movement of the control handle 107 adjacent the steering which will cause rotation of the selector cam member 86 in the transmission housing. These movements are obvious from the operating connections between these elements previously described. A lost motion provision is made between the movement of the clutch pedal and the movement of the shift rod frame 56. When the clutch pedal is in raised or clutch engaged position the rack teeth 79 on connecting rod 80 are spaced slightly from the gear sector 78. Initial movement therefore of the clutch pedal will not cause a corresponding movement of the frame 56. This lost motion is so regulated that after the pedal has been moved far enough to disengage the clutch, the rack teeth 79 mesh with the teeth on the sector and commence moving the frame 56 forwardly proportionately to the depression of the clutch pedal.

In Figs. 11 and 12, the elements in the transmission housing are in neutral position. The shift rods 43 to 46 are disposed equally opposite one another and the cam member 86 is so positioned that none of the flat faces 87, 88, 89 or 90 are disposed opposite their dog tappets so that all the locking dogs are held down in unlocking position against the tension of their coil springs 71. Shift rods 43 and 44 function to shift gears for "reverse" and "low" speeds. Shift rods 45 and 46 function to shift gears for "intermediate" and "high" speeds. To shift the gears in the transmission into "low" or first speed, the fork *t* as previously explained must be moved forwardly to cause the gear *u* to engage the auxiliary shaft gear *z*. Since the fork *t* is attached to the shift rod 45, this rod therefore must be moved to engage the gears for "low" speed.

To accomplish a change in the transmission from neutral to "low" speed, the selector arm 107 on the steering column is moved until it is opposite the notch designated as numeral "1". This movement will rotate cam member 86, by means heretofore described, in a clockwise direction from the position shown in Fig. 10 to that shown in Fig. 22, bringing cam face 87 above and parallel to tappet face 66. This tappet is integral with locking dog 63 on shift rod 43. Spring 71 is tending to raise this dog up but the bottom edge 72 of the rod aperture in the dog is withheld against the underside of the shift rod 43 as Fig. 22 indicates. The clutch pedal is now completely depressed causing the rectangular frame 56 in the transmission housing to move forwardly, by means heretofore described connecting the clutch pedal to the frame, until the rear wall 170 of the frame abuts the shoulders 171 to 174 of the shift rods. Since all four locking dog devices 83 are attached to the front wall 58 of the frame, they will all move longitudinally along the shift rods in unison with the frame until the bottom edges 72 of the rod apertures in the dogs appear opposite the notches 73 found in each shift rod. At the end of this frame stroke, the dog which is free for upward movement, which in this instance is the dog having the tappet 66, will rise vertically and the edge 72 will latch or interlock with the notch 73 provided in the shift rod. Since only one flat face on the cam member 86 can register with a tappet at one time, the other locking dogs are restrained from upward movement by the cylindrical surface of the cam member, thus preventing the dog portions 72 from entering the rod notches 73 when they are brought into alignment at the end of the forward stroke of the shift frame.

As the dog having tappet 66 is now interlocked with the frame, the return movement of the clutch pedal will shift the frame and shift rod 43 rearwardly in unison. By virtue of the pinion 48 and the rack teeth engaging therewith, the rearward motion of shift rod 43 will cause an equal forward motion of the shift rod 44 and its attached shifting fork t. Gear u will thereby mesh with low speed gear z and the transmission has been shifted into "low" speed. The meshing of these two gears, as well as any other gears in the transmission, takes place before the clutch pedal has fully returned to its raised position and before clutch engagement is effected by reason of the lost motion connection previously described between the rack teeth 79 and the gear sector 78.

In the case of reverse speed, where it is only necessary to move shift rod 44 rearwardly for engagement of gears u and v, this rod is actuated directly by the dog of tappet 67, its companion shift rod 43, merely being idled forwardly by pinion 48. The selecting and shifting for the two forward speeds, "intermediate" and "high", is obviously done in a like manner to that above described in connection with "reverse" and "low" speed shifting.

To shift from "low" to "second" or "intermediate" speed, the selector handle 107 on the steering column is shifted to opposite notch bearing numeral "2". Depression of the clutch pedal will move the rectangular frame 56 forwardly carrying the shift rod 43 and, conversely, causing the shift rod 44 to move rearwardly disengaging gear u from low speed gear z. The forward movement of the frame will be stopped when the rear wall 170 of the frame abuts all four shoulders 171 to 174 on shift rods, inasmuch as the forward and rearward pressures are equalized on alternate shoulders of the shift rods. The shift rods are now in neutral position but the frame is at the end of its forward stroke. The condition of the cam member 56, as predetermined by the selector handle 107 will allow that tappet to rise which will cause shifting to "second" speed upon rearward movement of the frame. In the present embodiment of the invention this is the tappet 68 which is associated with shift rod 45. Return movement of the clutch pedal, as effected by expansion of clutch spring e acting through clutch sleeve d and shaft f, will cause shift rod 45 and associated fork x to move rearwardly and cause the gear clutch y to engage with constant-mesh gear w for "intermediate" speed.

It is apparent, therefore that any forward stroke of the frame 56 will pick up a rearwardly positioned shift rod and return it and its forwardly positioned companion shift rod to normal or neutral position. It is also apparent that the frame would move rearwardly without carrying a shift rod therewith unless one of the latching dogs 63 had been preselected for locking engagement with its respective shift rod.

It is also clear by comparison of Figs. 21, 22 and 23 that the tappets 66 to 69 never move beyond contact with the cam member 86. Therefore any dog already engaged with a rod may be disengaged from the rod while the latter is in either forward or rearward position. It is obvious from the foregoing description, "progressive" speed selecting is not required, but that any speed desired may be selected, depending, of course, upon the physical factors involved at that time. Speed selections, such as the following, may be made; from "high" to "low" as on a hill; from "low" to "high" on the level or downgrade; and when starting, from "high" to "reverse" or from "neutral" to "intermediate".

A modified form of manually controlling the selector member 86 is shown in the drawings in Figs. 24 to 29 inclusive. These figures disclose a modification of the foregoing selecting elements, wherein control buttons "R", "N", "L", "I" and "H", corresponding to "reverse", "neutral", "low", "intermediate" and "high" respectively, are depressed manually to actuate the selecting elements within the shifting unit. The push buttons are attached to plungers 177 which reciprocate in apertures in the case 178 and plate 179. The button control unit may be mounted on the dash panel or upon the steering column. The four plungers actuate bell cranks 180 pivoted at 181. Bowden wires 182 are attached to said cranks and extend through flexible conduits 183 secured at one end to the case 178 and at the other end to the control housing 41' on the transmission.

The plungers have integral cam portions 184 normally held against the inner surface of case 178 by springs 185. The cam plate 186 has cam lips 187 bent outwardly. The plate is positioned within ways 188 and held in a retracted position abutting the case wall by springs 189 which engages notch 190 in said plate. When a plunger is pushed in, the cam 184 will bear against the lip 187 and force the plate to the right. When the cam passes the lip the plate will snap back to the left by virtue of the spring 189, and the plunger will be thus withheld in retracted position by the abutment of the cam portion 184 with the back end of the plate lip, as shown at "I" by plunger in Fig. 28. When a succeeding speed is to be selected, "high" for instance, the depression of the "H" plunger will cause its cam to bear against the corresponding lip and again impart a lateral movement to plate 186, and release the "I" plunger cam as the "H" plunger cam and lip engage. The "N" plunger only functions to release other plungers for "neutral".

The selector wires 182 extending within transmission control case 41' are each attached to U shaped stampings 191 having inclined slots 192 in the sides thereof, positioned within inverted U shaped members 193 attached to the top wall of the housing. Each inverted U shaped member 193 has a transverse pin 194 secured in the side walls thereof and extending into the inclined slots 192 upon which members 191 are adapted to reciprocate. A pair of such slot and pin combinations on each side of the members 191 serve to direct these members in a given path corresponding to the inclination of the slots. A spring 212 yieldingly urges each member 191 to a retracted inoperative position as shown in Fig. 24, where the bottom face 195 of said member serves to restrain movement of selector pawl 196. Four such selector pawls corresponding in number and position to the shift rods are pivoted on pins 197 secured in lugs on the front wall flange 61' of shifting frame 56'. Dogs 198 loosely pinned at 199 to the pawls, are piloted vertically through apertures in flange 61'. Coiled springs 200 about each pivot 197 yieldingly urge the dogs 198 downward.

In selecting, by depressing a plunger at the instrument panel, the corresponding wire and member 191 are pulled forward, the latter being also moved upward by means of the inclined slots guided on pins 194, to the position shown in Fig. 25. This movement will free the pawl 196, and when the shift frame 56' is moved forwardly the spring 200 will urge dog 198 to latch into the rod notch 73, interlocking the rod and frame for joint movement, as heretofore described.

The rod shifting frame 56' by a modified form of connection with the clutch shaft f is reciprocated by means of an adjustable rod 201 secured at the center of the frame front wall 58', as shown in Fig. 26. A compression spring 202, interposed between the bearing 204 and wall 58', urges the frame rearwardly until rod shoulder 203 abuts said bearing. A lever 205 pivoted at 206, is positioned to engage a pin 207 in the forward extremity of rod 201. One end of a link 208 is pivoted to lever 205 at 209; the other end has a slot 210 for over-running action on a pin 211 in the bifurcated lever 85', which is integral with the clutch throw-out trunnion, located directly above the center of the clutch throw-out shaft f.

At the end of the first portion of the forward movement of the lever 85', when the clutch becomes free, the pin 211 will pick up at the end of the link slot 210 and pull the shift frame forward, thereby permitting dog 198 to engage rod notch 73. Upon the return stroke of lever 85', said lever and shift frame will move rearwardly in unison until the clutch again starts to engage, during which movement the frame is shifted by means of the spring 202, after which the lever pin 211 will idle back in link slot 210 while the clutch comes into full engagement.

When a selecting plunger is released, the connecting wire 182 and member 191 are pushed back to the position in Fig. 24 by means of the plunger spring 185, member 191 being further urged downwardly by spring 212.

As previously mentioned, the gear shifting operation may be performed by a novel vacuum power device. This device may be associated with the gear shifting mechanism alone or in dual optional relationship with a manual means of shifting gears. In Figs. 1, 7, 8 and 9, there is a vacuum power device optionally associated with the clutch operated shifting mechanism previously described. The vacuum power device comprises, in general, a vacuum operated piston having operative connections through the clutch shaft with the rod shifting frame hereinabove described and separate valve control means associated with the piston and with the accelerator mechanism of the motor vehicle for controlling the operation of the vacuum power device.

Referring in detail to Fig. 1., a vacuum cylinder generally indicated at 115 is pivoted at 117 to a fixed bracket 118. The cylinder has an extended sleeve portion 116 on the opposite end. A piston 119 in the cylinder has a piston rod slidably received in the sleeve, the outer end of which is secured to the lever 113 by a pin 121. Arm 113, as previously described, is integrally joined to pick-up arm 112 which is freely journaled on clutch throw-out shaft f. The piston rod has a reduced diameter portion providing an annular valving chamber 122 which is adapted to reciprocate axially within the bore of the sleeve 116 in response to the movement of the piston. An axial passage 123 connects chamber 122 with the vacuum chamber in the cylinder 115 at all times. The sleeve has ports 124, 125 and 126 opening into the axial bore of same, and the cylinder 115 is provided with an atmosphere vent port 127 in the forward end.

The clutch pedal g has attached thereto an adjustable back-stop 128, and a retracting spring 129. The pedal is so adjusted that the back-stop abuts the floor boards 101, and the pick-up arm 112 abuts arm 116 when the clutch is in full engagement.

A vacuum supply reservoir 130, having a check valve 131, is connected to the motor fuel intake manifold l by a conduit 132. A manually operated reservoir shut-off valve 133 is controlled by a valve extension handle 134 located on the instrument panel r. A conduit 135 leads from valve 133 to a central passage 136 in the vacuum control valve unit generally designated as 137, and shown in detail in Fig. 7. The control valve unit comprises two valving pistons 138 and 139 adapted to reciprocate vertically within cylinders 140 and 141 respectively. The pistons are urged to seat upon the cylinder shoulders 142 by means of springs 143. Pistons 138 and 139 have transverse passages 144 and 145 respectively and are adapted to communicate with the central passage 136 in certain positions of the pistons as shown in Fig. 7. The pistons are restrained from rotative movement by guide pins 146 extending in the piston slots 147. Cylinders 140 and 141 in the valve unit have ports 148 and 149 respectively in transverse alignment with passage 136. Cylinder 139 has a second port 150.

The control valve unit 137 and operating vacuum cylinder unit 115 are connected by three conduits, 167, 168 and 169 connecting the above in respective order as follows; conduit 167 from port 148 to port 124, conduit 168 from port 149 to port 125, and conduit 169 from port 150 to port 126.

The valve unit 137 is operatively associated with the accelerator control mechanism. Referring to Fig. 1, piston 138 is capable of being unseated by the arm 151 of lever 152. Said lever is pivoted at 153 and is connected at 154 to the throttle rod o. The throttle lever m is urged to abut stop n when the throttle is closed, by means of the retracting spring 155. The accelerator pedal p, pivoted at the floor boards 101, has secured thereto a tubular pedal rod 156 which extends forwardly through the dash board, and freely telescopes a rod 157 which is also connected to lever 152 at 154. Rod 157 has an integral depending lug 158 operable axially in the slot 159 (see Fig. 7) of tubular rod 156. A spring 161 is attached to the lug 158 and connected to a corresponding lug on the shoulder 160 of tubular rod 156, to urge this rod rearwardly. Piston 139 is capable of being unseated by the dog 162, pivoted at 163. In normally retracted position of the pedal, shoulder 160 supports the dog 162 in raised condition thereby maintaining piston 139 in unseated condition. When pedal rod 156 is advanced, the dog 162 will drop to the pin 164 by virtue of gravity and the spring 143, at which time the shoulder 160 will abut shoulder 165 on rod 157, thus insuring a positive forward movement of the throttle rod o, as shown in Figs. 8 and 9.

The operation of the vacuum power device for shifting gears is as follows. Assume that the shift rods are in neutral position, that the motor is functioning and that the pedal p is in fully released position "A". In this position, both valve pistons 138 and 139 are in position as shown in Fig. 7 to deliver vacuum from the vacuum reservoir 130 to the cylinder 115. If handle 134 is pushed forward, vacuum will flow from the intake manifold to the cylinder through both the conduits 167 and 168. The path of the vacuum from the reservoir is through conduit 135, passage 136, dividing and entering transverse passage 144 and 145 in the valve pistons, and from them through conduits 167 and 168 respectively to ports 124 and 125 on sleeve 116 of the cylinder. The vacuum entering port 124 will pass into the annular valve chamber 122 and thence through conduit 123 to the face of the piston where it will act to draw the piston toward the rear end of the cylinder. As the piston reaches mid position in the cylinder the annular valve chamber will appear opposite the port 125 and admit vacuum and convey vacuum from this port to the face of the piston. The piston is therefore advanced from the forward end of the cylinder to the rearward end in two stages.

During the first stage of the piston's movement, or from the front end of cylinder 115 to the middle thereof, the piston acts through pickup arm 112 to swing the clutch throwout shaft f sufficient to disengage the clutch. During the second stage of its rearward movement, the piston acts through the connecting rod 80, rack teeth 79 and gear sector 78 to move the shift rod frame 56 from its rearward position to its forward position in the transmission. The disengagement of the clutch prior to the advance of the frame 56 is provided by the lost motion connection between the rack teeth 79 and gear sector 78 as previously described. Therefore when the motor is functioning with the control rod 34 pushed in and the accelerator in released position at "A", the piston will be shifted rearwardly the full distance in the cylinder, the clutch will be disengaged, and the shift rod frame will be at the forward end of its stroke in position to shift rods to the desired change of speed.

At this point, the selector arm 107 on the steering column may be adjusted to "low" gear opposite numeral "1", or any one of the control buttons in the modification in Figures 24 to 29 inclusive may be pushed if this modification is utilized. This causes a latching dog carried on the shift rod frame to interlock with the proper shift rod for shifting the transmission into "low" speed. Upon movement of the accelerator pedal from "A" to "B", dog 162 will fall as indicated in Fig. 8 and valve piston 139 will cut off the feed of vacuum through conduit 168 and open the conduit 169 to atmosphere through ports 150 and 213. This subjects the annular valve chamber 122 and the face of the piston 119 to atmospheric pressure. Since pressure is now balanced on opposite sides of the piston, the piston will move forwardly in the cylinder due to the expansion of the conical cylinder spring and the clutch spring e. When the accelerator pedal is in "B" position, the piston will not be able to move forwardly any further than its center position in the cylinder. Further forward movement will bring annular valve chamber 122 into communication with port 124 which is still subject to vacuum and this will cause the piston to reverse its movement. The piston will therefore float between the two extremes of its movement. The movement of the piston to its middle position will cause the shift rod frame to move rearwardly and shift the transmission into "low" gear. The clutch, however, is still disengaged.

Upon further depression of the accelerator pedal to "C"–"D", the shoulder 160 abuts shoulder 165 and accelerator movements are imparted to throttle rod o. Dog 151 is therefore pivoted clockwise and valve piston 138 falls and seats as indicated in Fig. 9. This cuts off the flow of vacuum through conduit 167 and port 124 and instead vents this conduit and this port to atmosphere through slot 147 and port 214 in the valve control unit. The face of the piston is immediately subjected to atmospheric pressure and moves forwardly through the cylinder under tension of the springs previously described. This piston movement causes the clutch to engage and the motor vehicle commences to move in "low" gear.

When the motor vehicle has gained sufficient momentum for shifting into "second" or "intermediate" gear, the pedal p is released. This will cause spring 155 to retract throttle rod o through dog lever 152 and spring 161 will retract tubular pedal rod 156 to its furtherest rearward position. Rearward movement of these rods will cause the control dog 151 and 162 to rise and unseat the valve pistons 138 and 139 respectively. This will cause delivery of vacuum through both conduits 167 and 168 to the cylinder and piston 119 therein will advance completely to the rear in two stages. In the meantime, the manual selector on the steering column or dash panel has been regulated for "second" gear. Upon depression of the accelerator pedal again to positions "C", "D" and further, this piston is caused to return to its forward position in two stages of movement, the first stage causing the return of the shift rod frame with the proper shift rod for "second" gear, and the second stage causing engagement of the clutch for propelling the motor vehicle in "second" gear. It is obvious that the shifting operations for the other speeds is due in a like manner to that above described.

In the foregoing vacuum control of my shifting mechanism, the vacuum control valve unit 137 is actuated by manual regulation of the accelerator pedal for all speeds. In the modification shown in Figs. 30 to 39, the vacuum control valve unit 221 is actuated by mechanical means regulated automatically by the speed of the vehicle, for all speeds ahead.

The valve unit 221 is responsive to the initial movement of the accelerator pedal p' by arm 215 pivoted thereto and extending forwardly engaging a slot in a valve plunger 218. The pedal has a pickup shoulder 216 registering with a corresponding shoulder on arm 215. When pedal p' is advanced to position "C", shoulder 216 will move far enough so that the arm 215 will fall to stop 217, thus permitting plunger 218 to descend. Thereafter the pedal will be free to continue forwardly without effecting the valve unit 221. On the return pedal stroke, shoulder 216 will pick up arm 215 at position "C" and again raise said arm and plunger.

The valve unit 221 is shown in detail in Fig. 34. The plunger 218 has a stem portion 219 extending downward through the chamber closure 236, and secured to a piston 220 adapted to reciprocate in the vertical valve chamber 224. The piston has two spaced annular peripheral passages 222 and 223, and an integral squared depending plunger 225 extending through a square aperture in the bottom of the valve chamber. A roller 226 is journaled to the lower extremity of the plunger 225.

A spring 227 interposed between the piston and closure 236, urges the piston downwardly when the pedal arm 215 is released. Located in the walls of chamber 224 are ports in pairs in transverse alignment, namely, 228 with 229, 230 with 231, 232 with 233, and 234 with 235. Conduit 135, leading from the vacuum reservoir, is connected to ports 229 and 233. The vacuum cylinder unit 115 and the conduits 167, 168 and 169 connected thereto are similar to the vacuum operated device described above. Conduit 167 is connected to ports 228 and 230 in the valve control unit 221. Conduit 168 is connected to port 232 and conduit 169 is connected to port 235.

The valve unit 221 and the gear shift mechanism previously described are rendered responsive to the speed of the vehicle by regulating mechanism driven from a moving part of the vehicle. In the embodiment of the invention described herein, this mechanism comprises a speed responsive device, such as the governor 243, operatively coupled to the propeller shaft i by sprocket chain 238 encircling the sprocket 237 keyed to the propeller shaft and sprocket 239 keyed to a stub shaft 240 which drives the governor. Arms of a conventional governor indicated as 243 are pivotally connected between one of the stub-shaft collars 242 and a free running collar 244, the last mentioned collar being restrained axially in a bearing on the rear extremity of a selector and valve actuating rod 245. It is apparent that any other speed responsive device could be employed in place of the conventional governor 243.

The actuating rod 245 is adapted to reciprocate axially in the bearings 246 of a supporting plate 247 secured to frame members k. A selecting cam block 248 is bored from end to end to receive the enlarged portion 249 of the rod, and is positioned axially on said rod by adjustment nuts 250. The block has lateral flanges 251 free to slide along plate 247, these flanges serving to maintain an upright position of the cam block. The top of the cam block has three flat horizontal cam faces, 252, 253 and 254, for "low", "intermediate" and "high" speeds, respectively, and arranged in step-down formation.

Operating linkages connecting the shift rod frame in the transmission with the automatic controller comprise a plunger 255, reciprocable in a vertical bearing 257, is provided with a roller 256 at the lower extremity. A link 258 connects the upper end of the plunger with an arm 259. Arm 259 and lever 96' are integrally formed on the hub 260 and keyed to the spindle 94', corresponding to spindle 94 in Figs. 13 and 16. A retracting spring 261 is secured at one end to stop 217 and at the other end to lever 96'.

The valve unit 221 is operatively connected to rod 245 through elements swingable about a fixed spindle 262 affixed to the motor case. Upon the spindle is freely mounted a cam sector 263 and a gear sector 264, the latter having an arcuate slot 265. A stud 266 is fixed in the cam sector and projects in the gear sector slot effecting an over-running rotative connection between these sectors. The gear sector meshes with the rack 267 on the forward end of the operating rod 245. A spring 268 is attached to sector 264 and secured to a fixed stud 269, for the purpose of retracting the operating rod. The cam sector has an arcuate face 270 and spaced cams 271 and 272 thereon. The cam sector is so spaced from the valve control unit 221 that piston 220 is seated in chamber 224 when the roller 226 contacts the sector face 270.

To manually selectively determine forward, neutral or reverse driving conditions a controller may be secured to the steering column comprising a bracket sector 273 having positioned thereunder an arm 274 fixedly attached to shaft 99. Linkages 104 and 98 operating from shaft 99 are connected to the shifting mechanism lever 96' in the same manner as shown in Figs. 1, 2 and 3. A pawl 276 having a pointer is hinged on a pin 277 between ears of a lug integral with arm 274. The outer end of the pawl is urged upward by a spring 278, as shown in Fig. 32, causing the pawl to abut the flat lug face 279, thus insuring a clearance between the pawl and sector surface, so that the arm is free for movement of speeds ahead. The pawl portion lying over the sector is beveled at 280 to permit it to ratchet over the sector teeth 281 struck out from bracket 273 as shown in Fig. 33. References "N" and "R" are marked opposite the teeth 281 to indicate "neutral" and "reverse". The pointed inner end of the pawl serves to indicate the speed for which the shifting mechanism selecting elements are positioned.

Manual operation of arm 274 is only required for "neutral" and "reverse" and for changing from either of the same to the sector indication "1" for speeds ahead. When pointer 276 is opposite indication "1" and forward speeds are made by the vehicle, the pointer will operate automatically from "1" to "3" and back as the selector cam roller 256 contacts the block cam faces 252 to 254 and back respectively, by virtue of the retracting spring 261 which functions to maintain contact of the plunger roller with the cam faces, when speeds within the above range are employed.

As the roller is in contact with cam face 252 for "low", or first speed ahead, as shown in Figs. 30 and 31, it is apparent that plunger 255 must be drawn upward against tension of spring 261 in selecting for "neutral" and "reverse"; therefore, for the latter selections, arm 274 must be moved manually to "N" or "R", when the pawl will ratchet over a tooth 281 and withhold the arm in register with the indication selected. The arm may be released from either of the latter positions by a downward pressure on the outer end of the pawl, when spring 261 will return the arm to position "1" on the sector.

The full line position of the elements in Figure 30 illustrates a condition of the automatic controller when the motor vehicle is at rest and the motor inoperative and the gears in the transmission engage in "low" position. To shift the gears in the transmission to "neutral" position, manual selector 276 on the steering column is carried over the tooth 281 opposite "N" and interlocked therewith upon release of manual pressure on the outer end of the selector 276. Complete depression and full release of the clutch pedal will now cause the shift frame in the transmission to move forward and shift the rods to neutral position and then move to its rearward position without effecting movement of any of the shift rods.

Assuming the apparatus in neutral condition as above described, operation of the motor will subject the reservoir 130 to suction. Upon pushing valve handle 134 flush with the dash panel suction is transmitted to valve unit 221 where by virtue of the raised condition of the valve piston 220, the suction divides and flows to the cylinder 115 by the two conduits 167 and 168. This causes the two-stage movement of the piston 119 described in earlier embodiments of the invention. In the first stage the clutch is disengaged and in the second stage the rod shift frame in the transmission performs its forward stroke. Either at this time, or earlier if desired, selector handle 276 on the steering column is swung to "low" gear opposite indication "1" on bracket 273. This rotates the cam selector in the transmission and interlocks the proper shift rod with the movable frame for causing "low" gear engagement in the transmission when the frame returns to its rearward position.

Depression of the accelerator pedal from "A" to position "C" will lower arm 215 and drop valve plunger 220 in the valve unit to the position shown in Fig. 36. In this position, the delivery of vacuum through both conduits 167 and 168 is cut off and conduit 169 is opened to atmosphere through port 234. This causes a complete forward advancement of the piston which shifts gears into "low" and engages the clutch. The motor vehicle commences to move in "low" gear. Further depression of the accelerator pedal increases the speed of the motor vehicle and the elements of the governor 243 will distend thereby causing rod 245 and associated cam block 248 to move rearwardly. When a predetermined speed of the vehicle is attained, the cam face 252 recedes from under roller 256 and the latter falls to cam face 253 as shown in Fig. 36. This movement will be transmitted by way of rods 255 and 258 to the cam member 86 in the transmission and cause the latter to assume a position which will interlock the frame with the proper shift rod for shifting the gears into "second" speed. During this movement of the rod 245, gear sector 264 will be rotated counter-clockwise but will not impart such movement to the cam sector 263 because of the lost motion connection between these sectors provided by the slot 265. However, as the motor vehicle increases in speed and produces further rearward movement of the rod 245, the cam sector 263 will be picked up and rotated until it assumes the position in Fig. 37.

In this position valve plunger 220 is raised and opens communication between vacuum line 135 and cylinder conduits 167 and 168, thereby causing the piston 119 to move rearwardly in two stages. This disengages the clutch and advances the rod shift frame to its forward position in the transmission thus disengaging the "low" gears and interlocking with the proper shift rod for accomplishing the shift to "second" gear speed. The continued acceleration of the motor vehicle even after the low gears are disengaged will cause further rearward movement of the rod 245, thus imparting further counter-clockwise movement of cam sector 263. Valve roller 226 will now descend to came face 270 between the cam portions 271 and 272 before the selector roller 256 leaves cam face 253. This condition is shown graphically in Fig. 38. The descent of the valve plunger 220 will cut off delivery of vacuum to the cylinder and piston 119 will return to its forward position, first causing "second" gear engagement and then clutch engagement of the propeller shaft to the motor unit.

The shifting operation to "high" speed is obviously accomplished in the same manner as for "low" and "second" speeds, leaving the elements in the position shown in Fig. 39. During all these automatic movements from "low" to "high" speeds, the selector handle 276 on the steering column follows the movement of the cam member 86 in the transmission and indicates to the driver the various conditions of the automatic apparatus.

When the vehicle is slowed down, the governor elements contract and control rod 245 will move forwardly and impart clockwise movement to gear sector 264. Because of the lost motion connection between gear sector 264 and cam sector 263, the vehicle is allowed to slow down considerably before gear and clutch disengagement take place. Continued deceleration will cause the valve plunger 220 to rise and fall successively over cams 272 and 271 and also cause the selector roller 256 to mount the stepped cams on the block 248. Due to the slot 265 in the gear sector 264, the movement of the cam selector 263 will follow slightly behind the step by step lifting movements of the selector roller 256. Thus both in acceleration and deceleration, the change of gear is selected before disengagement of the clutch and shifting of gears is effected.

In the event of failure of the automatic controller, it is apparent that the shifting mechanism may be operated by the clutch pedal for all speeds ahead, as well as for "neutral" and "reverse" by timing the pedal stroke in accordance with the gear selection indicated by the pointer 276 on the steering column.

What I claim:

1. In a variable speed transmission gear mechanism for an automobile, a pair of rods positioned in spaced side by side relationship, means supporting said rods for slidable lengthwise movement, a gear shifting member secured to one of said rods, a pinion rotatably supported between said rods, rack teeth on the adjacent sides of said rods engaging with said pinion and adapted upon movement of one of said rods to impart equal and opposite movement to the other rod, a rectangular frame having perforations in two opposite ends thereof in which the extremities of said rods are slidably disposed, means mounting said rectangular frame for reciprocable movement parallel to the direction of movement of said rods, a latching plate for each rod slidably mounted on one end of said frame and adapted to engage in a recess in its respectve rod when the frame is moved to a predetermined position, spring means carried by said frame yieldingly acting to withdraw said latching plates from engagement in said recesses, manual control means for separately moving said plates against the resistance of said springs into the recesses in said rods, means carried by said rods adjacent the other end of the frame and adapted to extend into the path of movement of said end of the frame, said last mentioned end of the frame adapted when the frame is moved in one direction of its movement to abut said means on said rods and cause the rods to be shifted thereby.

2. In a variable speed gear transmission for an automobile, a rectangular frame having aligned apertures in two opposite ends thereof, a plurality of gear shift rods mounted in the plane of said frame and having their opposite ends extending through the apertures in the frame, means supporting said rods for lengthwise slidable movement, means supporting said frame for lengthwise reciprocable movement, and separate means for each rod carried by one end of said frame and adapted to releasably lock its respective rod to the frame for joint lengthwise movement together in one direction to shift a gear in the transmission into mesh with another gear, and means carried by the other end of said frame adapted to engage any such rods thus shifted upon movement of the frame in the other direction and shift a gear out of mesh with another gear in the transmission.

3. In a variable speed gear transmission for an automobile, a gear shift rod, a second gear shift rod, a companion rod associated with each of said gear shift rods, means supporting said rods for lengthwise movement parallel to one another, means operatively associating each of said gear shift rods with its companion rod so that upon lengthwise movement of one of the rods the other will be moved simultaneously in the opposite direction, said rods in neutral gear disengaged position being disposed substantially equally opposite one another, a rectangular frame having apertures in the opposite ends thereof in which the opposite ends of said rods are slidably disposed, means for bodily moving said frame parallel to the path of movement of said rods from one position to another, one end of the frame adapted upon movement of the frame from one of said positions to the other to engage any one of said rods in gear engaged position and move the same until the rods are disposed substantially equally opposite one another in neutral position, latching means for each shift rod carried by the other end of the frame adaptable in said other position of the frame's movement to lock its respective shift rod to said frame for joint movement therewith.

4. A speed change gear mechanism for an automobile comprising, in combination, a plurality of gear shift rods arranged in parallel relationship and adapted to bodily move in parallel paths to shift the gears, a rectangular frame mounted for reciprocating movement in a path parallel to and adjacent to the paths of movement of the rods, means carried by one end of the frame for interlocking each rod with the frame for joint travel with the frame in one direction of its movement, control mechanism for selectively operating said rod and frame interlocking means carried by said end of the frame, means carried by each shift rod on the inside of the frame adjacent to the opposite end of the frame adapted to project into the path of travel of said end of the frame and be engaged and shifted thereby when the frame moves in the opposite direction.

5. Gear shift control mechanism for a motor vehicle comprising, in combination, a variable gear transmission, a clutch operable to couple the transmission to the power unit of the vehicle to receive driving impulses therefrom, a pair of gear shift rods in said transmission mounted for lengthwise movement in parallel paths, means coupling said rods together so that upon movement of one rod in one direction the other rod will move equally in the opposite direction, a rectangular frame mounted for reciprocating movement in said transmission along a path parallel to and adjacent to said rods, means operatively coupling said frame with said clutch so that the frame is movable from a position in the transmission corresponding to that when the clutch is fully engaged to a position in the transmission when the clutch is fully disengaged, latching means for each shift rod carried by one end of said frame adapted to lock its respective shift rod to the frame when the latter is in the position corresponding to that when the clutch is in the fully disengaged position and to move said shift rod jointly with the frame as it moves in response to the movement of the clutch to fully engaged position, control means selectively operable for actuating said latching means, the other end of said frame adapted when the clutch moves toward fully engaged position to contact rods thus shifted and return them to initial operating position.

ROBERT N. VAN BUSKIRK.